3,597,349
CATALYTIC COMPOSITION COMPRISING A PARTICULATE MIXTURE OF ULTRASTABLE ALUMINOSILICATE - CONTAINING SILICA-ALUMINA AND CATION-EXCHANGED Y-TYPE MOLECULAR SIEVES AND PROCESSES EMPLOYING SAME
Ralph J. Bertolacini, Chesterton, Harry M. Brennan, Hammond, and Louis C. Gutberlet, Crown Point, Ind., assignors to Standard Oil Company, Chicago, Ill.
No Drawing. Continuation-in-part of abandoned application Ser. No. 672,005, Oct. 2, 1967. This application Oct. 29, 1969, Ser. No. 872,400
Int. Cl. C10g 13/02
U.S. Cl. 208—111                                        28 Claims

ABSTRACT OF THE DISCLOSURE

The catalytic composition comprises a physical particulate mixture of a component (A) and a component (B). Component (A) comprises an amorphous silica-alumina support having dispersed uniformly through the matrix thereof an ultrastable, large-pore crystalline aluminosilicate material and having impregnated thereon a metal of Group VI-A, preferably molybdenum, and a metal of Group VIII, preferably cobalt; component (B) comprises Y-type molecular sieves which have been cation-exchanged with a Group VIII metal, preferably nickel. The processes are hydrocarbon-conversion processes employing this catalytic composition, particularly, a process for hydrocracking nitrogen-contaminated petroleum hydrocarbon fluids.

CROSS REFERENCE TO RELATED APPLICATION

This is a continuation-in-part application of co-pending U.S. patent application Ser. No. 672,005, which was filed Oct. 2, 1967, and is now abandoned.

BACKGROUND OF THE INVENTION

The invention pertains to a catalytic composition which is a physical particulate mixture of two components, one component containing an ultrastable, large-port crystalline aluminosilicate material dispersed in the matrix of an amorphous silica-alumina, a metal of Group VI-A of the Periodic Table of elements, and a metal of Group VIII, and the other component comprising cation-exchanged Y-type molecular sieves. The invention pertains further to processes for treating mineral oils which result in a chemical alteration of at least some of the hydrocarbon molecules of the mineral oils to form mineral oils having different properties. An example of these processes is a process wherein the mineral oils are treated in a cracking step in the presence of hydrogen.

SUMMARY OF THE INVENTION

Briefly, in accordance with the invention, there is provided an improved catalytic composition for the conversion of petroleum hydrocarbon fractions, and processes for converting petroleum hydrocarbon fractions, which processes employ this catalytic composition. This catalytic composition is particularly useful for hydrocracking nitrogen-containing gas oils.

The catalytic composition of this invention comprises a physical particulate mixture of two components, component (A) and component (B). Component (A) comprises an amorphous silica-alumina support having dispersed uniformly through the matrix thereof an ultrastable, large pore crystalline aluminosilicate material and having impregnated thereon a metal of Group VI-A of the Periodic Table of elements and a metal of Group VIII. Component (B) comprises Y-type molecular sieves which have been cation-exchanged with a metal of Group VIII. For component (A), the preferred metal of Group VI-A is molybdenum and the preferred metal of Group VIII is cobalt. For component (B), the preferred metal of Group VIII is nickel. The ultrastable, large-pore crystalline aluminosilicate material may be present in the silica-alumina in an amount between about 2 and about 50 percent by weight, based on the total weight of component (A). The Group VI-A and Group VIII metals of the Periodic Table may be present in component (A) as the metals, their oxides, or mixtures thereof. The preferred Group VI-A metal, molybdenum, may be present as $MoO_3$ in an amount within the range between about 4 and about 15 percent by weight, based on the weight of component (A). The preferred Group VIII metal, cobalt, may be present as CoO in an amount within the range between about 2 and about 5 percent by weight, based on the weight of component (A). In the case of component (B), the preferred metal, nickel, may be present in an amount within the range between about 0.5 and about 10 percent by weight, based on the weight of component (B). A suitable catalyst of this invention may contain component (A) in an amount within the range between about 95 percent by weight and 50 percent by weight, based on the total weight of the catalytic composition, and component (B) in an amount between about 5 percent by weight and about 50 percent by weight, based on the total weight of the catalytic composition. Moreover, such suitable catalyst may contain the ultrastable, large-pore crystalline aluminosilicate material in an amount between about 2 and about 50 percent by weight of the component (A).

The hydrocarbon-conversion processes of this invention employ the above catalytic composition. One embodiment of these processes is a process to convert a petroleum hydrocarbon stream to lower-boiling hydrocarbons. Typically, a hydrocarbon-conversion process of this invention may be used to convert a nitrogen-contaminated petroleum hydrocarbon stream to useful petroleum products. Preferably, the hydrocarbon-conversion process of this invention may be used to convert a nitrogen-contaminated petroleum hydrocarbon stream containing a substantial amount of cyclic hydrocarbons to useful petroleum products. This latter process comprises contacting the petroleum hydrocarbon stream in a hydrocarbon-conversion zone with a catalytic composition of this invention in the presence of a hydrogen-affording gas under hydrocarbon conversion conditions.

Accordingly, a specific embodiment of the process of this invention is a process for the hydrocracking of a nitrogen-contaminated gas oil (containing a substantial amount of cyclic hydrocarbons) to a lower-boiling product. The process of this specific embodiment comprises contacting the gas oil with a catalytic composition of this invention in the presence of a hydrogen-affording gas under hydrocracking conditions, including an average temperature between about 650° F. and about 825° F., preferably between about 680° F. and 800° F., and recovering the lower-boiling product.

If a process of this invention is employed to hydrocrack a petroleum hydrocarbon fraction, the preferred feedstock for such hydrocracking process is catalytic cycle oil from fluid catalytic cracking of virgin gas oils and/or light virgin gas oils from naphthenic crudes.

DESCRIPTION AND PREFERRED EMBODIMENTS

The processes of this invention and the capabilities of the catalytic composition of this invention and additional advantages thereof will be understood from the following description and examples of the invention.

A process of this invention advantageously may provide significant yields of very-high octane gasoline-boiling-range materials and naphtha hydrocarbons which may be subjected to further refining processes, such as solvent extraction and reforming. The solvent extraction may be used to separate the high-octane aromatics from the paraffins, and the paraffins obtained therefrom may then be reformed to produce very-high-octane gasoline material without the use of lead-containing anti-knock compounds. Hence, the process of this invention may be used to aid in the production of high-octane motor fuels which will not result in the introduction of lead compounds into the atmosphere from automobile exhausts to contribute to the pollution of the air in today's highly industrialized and mechanized society.

The surprising success of the hydrocracking process of this invention in producing a greater yield of very-high-octane gasoline blending stock, and accomplishing this at lower cost, is due primarily to the discovery of the particular catalytic composition employed and the conditions that are used. To achieve the very-high-octane material, it is important that the hydrocarbon feed to the reaction zone be one from which highly aromatic hydrocracked gasoline can be produced. The catalyst of this invention may be employed as a hydrocracking catalyst at a higher hydrocracking temperature than that normally employed in the industry. Surprisingly, this hydrocracking temperature can be employed with this particular catalyst with low catalyst activity decline rate, and sulfur and nitrogen need not be removed from the feed, permitting one-stage hydrocracking to be used in the hydrocracking step. Of course, two-stage hydrocracking may employ the catalyst of this invention. In such a two-stage process, the first stage, containing any typical hydrofining catalyst, is employed to pre-treat the feed for removal of sulfur and nitrogen and the second stage, containing the catalyst of this invention, is employed to hydrocrack the pre-treated feed.

One-stage hydrocracking employing the catalyst of this invention is a preferred hydrocracking process because of its greater aromatics production and lower equipment requirements, such as fewer reactor pressure vessels.

A typical hydrocarbon feedstock to be charged to the hydrocracking process of this invention may boil in the range between about 350° F. and about 1,000° F. When operating to maximize gasoline production, the feedstock preferably has an end-point not greater than about 700°–750° F. Typically, a light catalytic cycle oil, or a light virgin gas oil, or mixtures thereof, boiling in the range of from about 350° F. to 650° F., is employed as a feedstock. The feed may be pre-treated to remove compounds of sulfur and nitrogen. However, when employing the preferred catalyst of the invention, it is not necessary to pre-treat the feed to remove sulfur and nitrogen contaminants. The feed may have a significant sulfur content, ranging from 0.1 to 3 weight percent and nitrogen may be present in an amount up to 500 p.p.m. or more. Temperature, space velocity and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons have been found to be especially well-suited for providing a highly aromatic hydrocracked gasoline product. A very suitable feed contains at least about 35–40% aromatics and/or naphthenes. Paraffins are easily cracked, but produce a lower quality gasoline product. Olefinic naphthas containing light normal olefins may be mixed with the feed, since small amounts of such olefins have been found to be effective in increasing the hydrocracking conversion level.

Typically, the feedstock is mixed with a hydrogen-affording gas and preheated to hydrocracking temperature, then transferred to one or more hydrocracking reactors. Advantageously, the feed is substantially completely vaporized before being introduced into the reactor system. For example, it is preferred that the feed be all vaporized before passing through more than about 20% of the catalyst bed in the reactor. In some instances, the feed may be mixed phase vapor-liquid, and the temperature, pressure, recycle, etc. may be then adjusted for the particular feedstock to achieve the desired degree of vaporization.

The feedstock is contacted in the hydrocracking reaction zone with the hereinafter described catalyst in the presence of hydrogen-affording gas. Hydrogen is consumed in the hydrocracking process and an excess of hydrogen is maintained in the reaction zone. Advantageously, a hydrogen-to-oil ratio of at least 5,000 standard cubic feet of hydrogen per barrel of feed (s.c.f.b) is employed, and the hydrogen-to-oil ratio may range up to 20,000 s.c.f.b. Preferably, about 8,000 to 12,000 s.c.f.b. is employed. A high hydrogen partial pressure is desirable from the standpoint of prolonging the catalyst activity maintenance.

The hydrocracking reaction zone is operated under conditions of elevated temperature and pressure. The total hydrocracking pressure usually is between about 700 and 3,000 p.s.i.g. and, preferably, between 1,000 and 1,800 p.s.i.g. The average hydrocracking catalyst bed temperature is between about 650° F. and 850° F., and preferably a temperature between about 680° F. and 800° F. is maintained. Liquid hourly space velocity (LHSV) typically is between 0.5 and 5 volumes of feed per hour per volume of catalyst, and preferably between 1 and 3 LHSV, optimally, 1 to 2 LHSV, is employed.

The catalytic composition of this invention comprises a physical particulate mixture of 2 components, (A) and (B). Component (A) comprises an amorphous silica-alumina support having dispersed uniformly through the matrix thereof an ultrastable, large-pore crystalline alumino-silicate material and having impregnated thereon a metal of Group VI–A and a metal of Group VIII of the Periodic Table of elements. Preferably, molybdenum is selected as the metal of Group VI–A and cobalt is selected as the metal of Group VIII. Component (B) comprises Y-type molecular sieves which have been exchanged with a metal of Group VIII. The preferred metal for this cation exchange is nickel.

There is now available an ultrastable, large-pore crystalline aluminosilicate material. This ultrastable, large-pore crystalline aluminosilicate material, sometimes hereinafter referred to as "ultrastable aluminosilicate material," is employed in the catalytic composition of the present invention. It is an important component of that catalytic composition and is believed to be quite different from the prior art aluminosilicates employed in hydrocarbon conversion catalysts. It is an ultrastable material; that is, it is stable to exposure to elevated temperatures and is stable to repeated cycles of wetting and drying.

The ultrastable aluminosilicate material is a large-pore material. By large-pore material is meant a material that has pores which are sufficiently large to permit the passage thereinto of benzene molecules and larger molecules, and the passage therefrom of reaction products. For use in catalysts that are employed in petroleum hydrocarbon conversion processes, it is preferred to employ a large-pore crystalline aluminosilicate material having a pore size of at least 8 to 10 angstrom units (A.). The ultrastable aluminosilicate material of the catalyst of the present invention possesses such a pore size.

An example of the ultrastable, large-pore crystalline aluminosilicate material that is employed in the catalyst of this invention is Z–14US Zeolite, which is described in the U.S. Pat. 3,293,192.

The ultrastable aluminosilicate material is quite stable to exposure to elevated temperatures. This stability may be demonstrated by its surface area after calcination at 1725° F. For example, after a two-hour calcination at 1725° F., a surface area that is greater than 150 square meters per gram (m.²/gm.) is retained. Moreover, its stability is demonstrated by its surface area after a steam treatment with an atmosphere of 25 percent steam at a temperature of 1525° F. for 16 hours. The surface area after this steam treatment is greater than 200 m.²/gm. This stability to elevated temperatures is discussed in U.S. Pat. 3,293,192.

The ultrastable aluminosilicate material exhibits extremely good stability toward wetting, which is defined as that ability of a particular aluminosilicate material to retain surface area or nitrogen-adsorption capacity after contact with water or water vapor. It has been found that ultrastable, large-pore crystalline aluminosilicate material containing about 2 percent sodium (the "soda" form of the ultrastable aluminosilicate material) exhibited a loss in nitrogen-adsorption capacity that is less than 2 percent per wetting, when tested for stability to wetting by subjecting the material to a number of consecutive cycles, each cycle consisting of a wetting and a drying.

The cubic unit cell dimension of the ultrastable, large-pore crystalline aluminosilicate material is within the range of about 24.20 A. to about 24.55 A. Since the X-ray techniques employed today to measure this dimension are much more sophisticated and accurate than those used to obtain the earlier measurements, this range has been slightly enlarged over that which had been disclosed previously in Ser. No. 672,005, the parent of this application.

The infrared spectra of dry ultrastable, large-pore crystalline aluminosilicate material always show a prominent band near 3700 cm.$^{-1}$ (3695±5 cm.$^{-1}$), a band near 3750 cm.$^{-1}$ (3745±5 cm.$^{-1}$), and a band near 3625 cm.$^{-1}$ (±10 cm.$^{-1}$). The band near 3750 cm.$^{-1}$ is typically seen in the spectra of all synthetic faujasites. The band near 3625 cm.$^{-1}$ is usually less intense and varies more in apparent frequency and intensity with different levels of hydration. The band near 3700 cm.$^{-1}$ is usually more intense than the 3750 cm.$^{-1}$ band. The band near 3700 cm.$^{-1}$ and the band near 3625 cm.$^{-1}$ appear to be characteristic of the ultrastable aluminosilicate material.

It is believed that a substantial proportion or amount of this ultrastable, large-pore crystalline aluminosilicate material is characterized by the apparently unique, well-defined hydroxyl bands near 3700 cm.$^{-1}$ and near 3625 cm.$^{-1}$. By a substantial proportion is meant a major part of the ultrastable aluminosilicate material, i.e., an amount in excess of 50 weight percent.

While the above-mentioned two bands which appear near 3700 cm.$^{-1}$ and near 3625 cm.$^{-1}$, respectively, appear to be characteristic of the ultrastable aluminosilicate material which is a component of the catalytic composition employed in this invention and have not as yet been described in the literature, it is quite possible that they might appear, at a weak intensity, in the infrared spectra of a decationized Y-type or other aluminosilicate material, if that aluminosilicate material were to be subjected to the proper treatment employing the proper conditions.

It is believed that the ultrastable, large-pore crystalline aluminosilicate material of the catalytic composition that is employed in the process of this invention can be identified properly by the hydroxyl infrared bands near 3700 cm.$^{-1}$ and near 3625 cm.$^{-1}$, particularly the former, when considered in conjunction with the characteristic small cubic unit cell dimension. For example, such identification or description will distinguish the ultrastable aluminosilicate material from the "high-silica" faujasites described in Dutch patent application 6707192, which "high-silica" faujasites have the small cubic unit cell but do not exhibit the 3700 cm.$^{-1}$ and 3625 cm.$^{-1}$ infrared bands. Furthermore, while unstable decationized Y-type aluminosilicate materials may provide hydroxyl infrared bands near 3700 cm.$^{-1}$ and near 3625 cm.$^{-1}$, if such aluminosilicate materials were to receive the proper treatment, they do not exhibit the appropriate smaller cubic unit cell dimension that is characteristic of the ultrastable, large-pore crystalline aluminosilicate material.

In addition to the unique hydroxyl infrared bands and the smaller cubic unit cell dimension, the ultrastable, large-pore crystalline aluminosilicate material is characterized by an alkali metal content that is less than 1 weight percent.

The ultrastable, large-pore crystalline aluminosilicate material can be prepared from certain faujasites by subjecting the latter to special treatment under specific conditions. The preparation usually involves a first step wherein most of the alkali metal cation is cation-exchanged with an ammonium salt solution to leave approximately enough alkali metal cations to fill the bridge positions in the faujasite structure. After this cation-exchange treatment, the aluminosilicate material is subjected to a heat treatment at a temperature within the range of about 700° C. (1292° F.) to about 800° C. (1472° F.), or higher. The heat-treated aluminosilicate material is then subjected to further cation-exchange treatment to remove additional residual alkali metal cations. A typical preparation of the ultrastable, large-pore crystalline aluminosilicate material is considered in U.S. Pat. 3,293,192.

The Group-VIII-metal-exchanged Y-type molecular sieves comprise a particular type of crystalline zeolitic aluminosilicates which have been cation-exchanged with a Group VIII metal. Preferably, nickel is the Group VIII metal employed. The Y-type molecular sieves, sometimes referred to as "zeolite Y," have a SiO$_2$/Al$_2$O$_3$ ratio that is greater than about 3.0 and a chemical formula expressed in terms of mole oxides as:

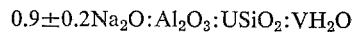

$$0.9\pm 0.2\text{Na}_2\text{O}:\text{Al}_2\text{O}_3:\text{USiO}_2:\text{VH}_2\text{O}$$

where U represents a value greater than 3 up to about 6 and V may be a value up to about 9. These properties, as well as the characteristic X-ray diffraction pattern, and the method of preparation of the Y-type molecular sieves are discussed in U.S. Pat. 3,130,006, assigned to Union Carbide Corporation.

The Y-type molecular sieves employed in the catalytic composition of this invention are cation-exchanged with a selected Group VIII metal. Typically, the sieves are contacted with an aqueous solution of the cations of the Group VIII metal for an extended period of time, or for several successive periods of time, at elevated temperatures. Advantageously, the Y-type molecular sieves may be contacted with the aqueous solution containing the cations of the selected Group VIII metal for a specified length of time. Then, the sieves thus treated are filtered and washed with distilled water. This cation-exchange procedure may be repeated several times. After the sieves are filtered and washed in the last exchange step, they are dried. Of course, the greater the length of time that the sieves are contacted with the aqueous solution containing the exchangeable cations, the more complete is the desired exchange.

As an alternative method of cation exchange, the Y-type, molecular sieves may be contacted first with a solution of an ammonium salt or other salt which decomposes to leave the hydrogen-form of sieves when the sieves so contacted are dried and/or calcined. The thusly-treated molecular sieves may be contacted subsequently with an aqueous solution of a suitable compound of the selected Group VIII metal, washed, dried and calcined.

Advantageously, the catalytic composition of this invention can be prepared as follows. The ultrastable, large-pore crystalline aluminosilicate material, in a finely-divided state, may be added to a hydrogel of silica-alumina and blended therein to form a homogeneous mixture. The hydrogenation components, i.e., the metals of Group VI-A and Group VIII, may be added in the form of heat-decomposable components to this homogeneous mixture. The resulting composition is then thoroughly mixed. The heat-decomposable components may be added in a single solution or in several solutions. The resulting blended composition is then dried to a moisture content ranging between 10 and 40 percent by weight, based on the total weight of the composition. The dried material is then calcined at a temperature between 900° F. and 1,050° F. Prior to calcining the dried material may be pulverized, or it may be pulverized, pelleted, calcined, and then subsequently pulverized to a fine mesh material prior to being admixed with component (B).

Component (B) of the catalytic composition of this invention may be prepared by exchanging the sodium-form of Y-type molecular sieves with a solution of the Group VIII metal cation. In the case where nickel is the Group VIII cation, a solution of nickel nitrate may be used advantageously. The Y-type molecular sieves are contacted with the solution of nickel nitrate for 4 hours, then filtered and washed with distilled water. This exchange step may be repeated several times, for example, 3 more times. After the last exchange step, the nickel-exchanged sieves may be dried.

The catalytic composition of this invention is then finalized by physically admixing component (A) with component (B) in the desired proportions of each. Of course, component (A) and component (B) each must be in a finely-divided state.

Several embodiments of the catalytic composition of this invention were prepared and the descriptions of these preparations are presented in Examples I and II.

EXAMPLE I

Component (A) of a specific embodiment of the catalytic composition of this invention was prepared as follows: A solution containing cobalt nitrate and ammonium molybdate was prepared. First, 5.84 gm. of cobalt nitrate, $Co(NO_3)_2$, were dissolved in 20 ml. of distilled water and 6.06 gm. of ammonium molybdate were dissolved in 40 ml. of distilled water. The resultant solutions were combined. This combination solution was then used to impregnate 90 gm. of a powdered cracking catalyst, which comprised ultrastable, large-pore crystalline alumino-silicate material dispersed in a matrix of low-alumina silica-alumina. This low-alumina silica-alumina, which contained 13 percent by weight of alumina, contained about 13 percent by weight of the ultrastable, large-pore crystalline aluminosilicate material. The impregnated material was dried under an infrared lamp overnight, the temperature of the surface of this impregnated material during the drying being maintained between about 100 F. and 250° F.

Component (B) was prepared as follows: 100 gm. of sodium-form Y-type molecular sieves manufactured by the Union Carbide Corporation were cation-exchanged with the nickel cations in a nickel solution. This nickel solution was prepared by dissolving 25 gm. of nickel nitrate, $Ni(NO_3)_2$, in 500 ml. of distilled water. The cation-exchange consisted of contacting Y-type sieves with the nickel solution at about 194° F. for 4 hours. The sieves were then filtered and washed with distilled water. The exchange step was repeated 3 more times, each step being carried out for 4 hours. Subsequent to the fourth cation-exchange step, the nickel-exchanged sieves were dried overnight under an infrared lamp, the temperature at the surface of the sieves being maintained between 100° F. and 250° F.

The catalytic composition was completed by physically admixing 10 gm. of component (B), i.e., the nickel-exchanged molecular sieves, with 90 gm. of the powdered component (A), i.e., the silica-alumina having dispersed in its matrix ultrastable, large-pore crystalline aluminosilicate material and the cobalt and molybdenum. The resulting mixture was pelleted with 2 percent Sterotex and calcined for 6 hours in flowing air at 1,000° F. The air rate was maintained at about 1 cubic foot of air per hour. The resultant catalytic composition contained about 2.5 percent by weight CoO and about 5 percent by weight $MoO_3$, based on the weight of component (A); about 7.8 percent by weight nickel, based on the weight of component (B); and 10 percent by weight component (B), based on the total weight of the catalytic composition. It was designated as Catalyst I.

EXAMPLE II

The second embodiment of the catalytic composition of this invention was prepared by physically mixing components (A) and (B), which were prepared as discussed in Example I, in the proper amounts to produce a mixture which contained 25 percent by weight of component (B) and 75 percent by weight of component (A). Then the mixture was pelleted with 2 percent Sterotex and calcined for 6 hours in flowing air at 1,000° F. and an air rate of at least 1 cubic foot per hour. This catalyst was identified as Catalyst II.

EXAMPLE III

A third catalyst was prepared. This catalyst was not an embodiment of the present invention. This catalyst was prepared by impregnating a selected support with cobalt and molybdenum and converting the metals to their oxides. The selected support was made up of a low-alumina silica-alumina matrix having dispersed uniformly therein sufficient ultrastable, large-pore crystalline aluminosilicate material to provide 13 percent by weight of said aluminosilicate material in said support. The impregnated material was subsequently dried and calcined in air at 1,000° F. to produce the oxides of cobalt and molybdenum. The resultant catalyst was found to contain 2.44 perecnt by weight of CoO and 4.77 percent by weight of $MoO_3$. The amorphous silica-alumina contained 13 percent by weight of alumina. This catalytic composition was identified as Catalyst III.

EXAMPLE IV

A fourth catalyst was prepared. This catalytic composition was prepared by impregnating a selected support with a solution of cobalt acetate followed by a solution of ammonium molybdate. The selected support consisted of amorphous silica-alumina having dispersed in its matrix an ultrastable, large-pore crystalline aluminosilicate material. The support contained 13 percent by weight of the aluminosilicate material. The finished catalyst contained 2.5 percent by weight of CoO and 10 percent by weight of $MoO_3$. This catalyst was identified as Catalyst IV.

EXAMPLE V

Each of the above-identified catalysts was tested in a bench-scale hydrocarbon-conversion unit. This bench-scale test unit employed a reactor which was 20 inches long and which possessed an I.D. of 0.96 inch. The temperature of the catalyt bed was measured by an axial thermowell which extended from the top reactor closure down through the catalyst bed in the vertical reactor. Each charge of catalyst contained 50 cc. of catalyst and provided a catalyst-bed length of about 5 inches. Each of these tests employed once-through operation, i.e., each did not treat recycled hydrocarbons and/or hydrogen. Products were recovered by means of conventional small-scale product recovery equipment. Both the gas samples and liquid samples obtained from the unit were analyzed by gas-chromatographic methods. The conversion obtained from this small-scale test unit is defined as the conversion to product boiling below 380° F. (TBP), as determined by gas-chromatographic analysis. This conversion product includes the gaseous product, which is also determined by gas-chromatographic methods. The unit was operated to maintain a 77 percent conversion of the hydrocarbons passing through the unit. The temperature required to maintain 77% conversion is calculated from the observed data through the use of zero-order reaction kinetics and an activation energy of 35 Kcal.

In each of these tests, a feedstock comprising 70 percent by volume light catalytic cycle oil and 30 perecnt by volume light virgin gas oil was employed. This feedstock possessed the properties presented in Table I.

TABLE I

Properties of hydrocarbon feedstock

| | |
|---|---|
| Gravity, ° API | 27.6 |
| Sulfur, wt. percent | 0.26 |
| Nitrogen, p.p.m. by wt. | 160 |
| ASTM dist., ° F.: | |
| IBP | 398 |
| 10% | 476 |
| 30% | 506 |
| 50% | 533 |
| 70% | 563 |
| 90% | 614 |
| EBP | 632 |
| Type analysis, vol. percent: | |
| Paraffins and naphthenes | 53.0 |
| Olefins | 2.0 |
| Aromatics | 45.0 |

Each catalyst was pretreated by passing once-through hydrogen over the catalyst at a hydrogen flow rate of 4.5 standard cubic feet per hour for a period of time between 2 and 3 hours at a pressure of 1250 p.s.i.g. and a temperature of 600° to 650° F. The activity of each catalyst that was tested has been expressed as the temperature required to produce 77 percent conversion of the hydrocarbons that are charged to the reactor. The heavy naphtha has been defined as the 180°-380° F. product determined by gas-chromatography. The heavy naphtha yield was calculated at 77 percent conversion and at 725° F. from the observed data. Corrections of the heavy naphtha yield for temperature and conversion were obtained through the use of the following equation:

$$H = H_0 - 9.3 \times 10^4 \left(\frac{1}{T_0} - \frac{1}{T}\right) - 7.5 \times 10^8 \left(\frac{1}{T_0} - \frac{1}{T}\right)^2 - 13.2 \log \left(\frac{100 - C_0}{100 - C}\right)$$

where H is the heavy naphtha yield observed at T ° K. and C% conversion; $H_0$ is the heavy naphtha yield calculated for $T_0$° K. and $C_0$% conversion; $T_0$ is 658° K. (725° F.) and $C_0$ is 77% conversion.

The data obtained from the tests made with the above-described catalysts are presented in Table II. In each test the operating conditions included a pressure of 1250 p.s.i.g., a hydrocarbon feed rate of 60 cc. per hour and a hydrogen-to-oil ratio of 12,000 standard cubic feet of hydrogen per barrel of hydrocarbon.

TABLE II

| Catalyst | Days on stream | Temp. for 77% conversion, ° F. | Heavy naphtha at 77% conv. and 725° F., wt. percent |
|---|---|---|---|
| I | 2 | 722 | 53.3 |
| I | 3 | 714 | 54.2 |
| I | 4 | 714 | 71.5 |
| I | 8 | 718 | 52.6 |
| I | 9 | 718 | 54.7 |
| I | 11 | 718 | 53.8 |
| I | 14 | 720 | 51.0 |
| I | 15 | 720 | 51.8 |
| II | 1 | 714 | 53.3 |
| II | 2 | 712 | 52.6 |
| II | 5 | 714 | 54.4 |
| II | 6 | 723 | 55.6 |
| II | 7 | 719 | 55.4 |
| II | 9 | 719 | 54.3 |
| II | 12 | 717 | 53.4 |
| III | 1 | 734 | 58.7 |
| III | 4 | 732 | 57.7 |
| III | 5 | 734 | 57.8 |
| IIIa | 1 | 724 | 58.0 |
| IIIa | 4 | 727 | 59.1 |
| IIIa | 5 | 730 | 57.7 |
| IV | 2 | 727 | 55.1 |
| IV | 5 | 727 | 55.4 |
| IV | 6 | 728 | 55.2 |
| IV | 7 | 729 | 54.0 | a Same as III except catalyst was recalcined at 1,000° F. for 2 hours before being charged to the reactor.

These data show that the catalysts which are specific embodiments of the catalytic composition of this invention possess activities for converting the gas oil which are greater than those of the other catalysts, while furnishing heavy naphtha yields which are not too dissimilar.

It is to be understood that the above examples are not intended to limit the scope of the present invention, but are presented for purposes of illustration only.

What is claimed is:

1. A catalytic composition comprising a physical particulate mixture of a component (A) and a component (B), said component (A) comprising an amorphous silica-alumina cracking catalyst support having dispersed uniformly through the matrix thereof an ultrastable, large-pore crystalline aluminosilicate material and having impregnated thereon a metal of Group VI-A of the Periodic Table of elements and a metal of Group VIII of the Periodic Table, and said component (B) comprising Y-type molecular sieves which have been cation-exchanged with a metal of Group VIII of the Periodic Table.

2. The catalytic composition of claim 1 wherein said component (A) is present in an amount between about 50 and about 95 percent by weight and said component (B) is present in an amount between about 50 and about 5 percent by weight, based on the total weight of said catalytic composition.

3. The catalytic composition of claim 2 wherein a substantial amount of said ultrastable, large-pore crystalline aluminosilicate material is characterized by well-defined hydroxyl infrared bands near 3700 cm.$^{-1}$ and near 3625 cm.$^{-1}$ and wherein said ultrastable, large-pore crystalline aluminosilicate material is characterized further by an alkali metal content that is less than one weight percent, a maximum cubic unit cell dimension of 24.55 A., and a superior ability to withstand repeated wetting-drying cycles.

4. The catalytic composition of claim 3 wherein said metal of Group VI-A of said component (A) is molybdenum.

5. The catalytic composition of claim 3 wherein said metal of Group VIII of said component (A) is cobalt.

6. The catalytic composition of claim 3 wherein said metal of Group VIII of said component (B) is nickel.

7. The catalytic composition of claim 3 wherein said ultrastable, large-pore crystalline aluminosilicate material is present in an amount within the range between about 2 and about 50 percent by weight, based on the weight of component (A).

8. The catalytic composition of claim 3 wherein said metal of Group VI-A of said component (A) is molybdenum and said metal of Group VIII of said component (A) is cobalt, said metals being present as their oxides, said molybdenum being present as 4 to 15 percent by weight $MoO_3$ and said cobalt being present as 2 to 5 percent by weight CoO, based on the weight of said component (A).

9. The catalytic composition of claim 3 wherein said metal of Group VIII of said component (B) is nickel and is present in an amount within the range between about 0.5 and about 10 percent by weight, based on the weight of said component (B).

10. The catalytic composition of claim 7 wherein said metal of Group VI-A of said component (A) is molybdenum and said metal of Group VIII of said component (A) is cobalt, said metals of said component (A) being present as their oxides, said molybdenum being present as 4 to 15 percent by weight $MoO_3$ and said cobalt being present as 2 to 5 percent by weight CoO, based on the total weight of said component (A), and wherein said metal of Group VIII of said component (B) is nickel and is present in an amount between about 0.5 and about 10 percent by weight, based on the weight of said component (B).

11. The catalytic composition of claim 10 wherein said silica-alumina is a low-alumina silica-alumina.

12. A process for converting a petroleum hydrocarbon fraction, which process comprises contacting said petroleum hydrocarbon fraction under hydrocarbon conversion conditions with the catalytic composition of claim 3.

13. A process for converting a petroleum hydrocarbon fraction, which process comprises contacting said petroleum hydrocarbon fraction under hydrocarbon conversion conditions with the catalytic composition of claim 10.

14. A process for converting a nitrogen-contaminated gas oil to lower-boiling product, which process comprises contacting said gas oil with the catalytic composition of claim 3 under hydrocracking conditions.

15. A process for converting a nitrogen-contaminated gas oil to lower-boiling product, which process comprises contacting said gas oil with the catalytic composition of claim 7 under hydrocracking conditions.

16. A process for converting a nitrogen-contaminated gas oil to lower-boiling product, which process comprises contacting said gas oil with the catalytic composition of claim 10 under hydrocracking conditions.

17. A process for converting a nitrogen-contaminated gas oil to lower-boiling product, which process comprises contacting said gas oil with the catalytic composition of claim 10 in a hydrocracking reaction zone in the presence of a hydrogen-affording gas under hydrocracking conditions, said hydrocracking conditions including a total hydrocracking pressure between about 700 and about 3,000 p.s.i.g.; a hydrogen-to-oil ratio between about 5,000 s.c.f.b. and about 20,000 s.c.f.b.; an average catalyst bed temperature within the range between about 650° F. and about 825° F.; and an LHSV within the range between about 0.5 and about 5 volumes of hydrocarbon per hour per volume of catalyst.

18. A process for converting a nitrogen-contaminated gas oil to a lower-boiling product, which process comprises contacting said gas oil with the catalytic composition of claim 10 in a hydrocracking reaction zone in the presence of a hydrogen-affording gas under hydrocracking conditions, said hydrocracking conditions including a total hydrocracking pressure between about 1,000 p.s.i.g. and about 1,800 p.s.i.g.; a hydrogen-to-oil ratio between about 8,000 s.c.f.b. and about 12,000 s.c.f.b.; an average catalyst bed temperature within the range between about 680° F. and about 800° F.; and an LHSV within the range between about 1 and about 3 volumes of hydrocarbon per hour per volume of catalyst.

19. A process for converting a nitrogen-contaminated gas oil to lower-boiling product, which process comprises contacting said gas oil with the catalytic composition of claim 11 in a hydrocracking reaction zone in the presence of a hydrogen-affording gas under hydrocracking conditions including a total hydrocracking pressure between about 700 and about 3,000 p.s.i.g.; a hydrogen-to-oil ratio between about 5,000 s.c.f.b. and about 20,000 s.c.f.b.; an average catalyst bed temperature within the range between about 650° F. and about 825° F.; and an LHSV within the range between about 0.5 and about 5 volumes of hydrocarbon per hour per volume of catalyst.

20. A process for converting a nitrogen-contaminated gas oil to a lower-boiling product, which process comprises contacting said gas oil with the catalytic composition of claim 11 in a hydrocracking reaction zone in the presence of a hydrogen-affording gas under hydrocracking conditions, said hydrocracking conditions including a total hydrocracking pressure between about 1,000 p.s.i.g. and about 1,800 p.s.i.g.; a hydrogen-to-oil ratio between about 8,000 s.c.f.b. and about 12,000 s.c.f.b.; an average catalyst bed temperature within the range between about 680° F. and about 800° F.; and an LHSV within the range between about 1 and about 3 volumes of hydrocarbon per hour per volume of catalyst.

21. The process of claim 17 wherein said average catalyst bed temperature is within the range between about 680° F. and 800° F.

22. The process of claim 17 wherein said LHSV is within the range between about 1 and about 3 volumes of hydrocarbon per hour per volume of catalyst.

23. The process of claim 17 wherein said hydrogen-to-oil ratio is within the range between about 8,000 s.c.f.b. and about 12,000 s.c.f.b.

24. The process of claim 17 wherein said total pressure is within the range between about 1,000 and 1,800 p.s.i.g.

25. The process of claim 19 wherein said average catalyst bed temperature is within the range between about 680° F. and 800° F.

26. The process of claim 19 wherein said LHSV is within the range between about 1 and about 3 volumes of hydrocarbon per hour per volume of catalyst.

27. The process of claim 19 wherein said hydrogen-to-oil ratio is within the range between about 8,000 s.c.f.b. and about 12,000 s.c.f.b.

28. The process of claim 19 wherein said total pressure is within the range between about 1,000 and 1,800 p.s.i.g.

References Cited

UNITED STATES PATENTS

| 3,143,491 | 8/1964 | Bergstrom | 208—120 |
| 3,431,196 | 3/1969 | Dobres et al. | 208—111 |
| 3,140,253 | 7/1964 | Plank et al. | 208—120 |

DELBERT E. GANTZ, Primary Examiner

R. M. BRUSKIN, Assistant Examiner

U.S. Cl. X.R.

252—455Z

UNITED STATES PATENT OFFICE
CERTIFICATE OF CORRECTION

Patent No. 3,597,349        Dated August 3, 1971

Inventor(s) Ralph J. Bertolacini; Harry M. Brennan; and Louis C. Gutberlet

It is certified that error appears in the above-identified patent and that said Letters Patent are hereby corrected as shown below:

Column 8, line 51, "catalyt" should be -- catalyst --.

Column 9, line 55, in Table II, "71.5" should be -- 51.5 --.

Signed and sealed this 21st day of March 1972.

(SEAL)
Attest:

EDWARD M. FLETCHER, JR.
Attesting Officer

ROBERT GOTTSCHALK
Commissioner of Patents